US00RE37548E

(19) United States
(12) Reissued Patent
Hays

(10) Patent Number: US RE37,548 E
(45) Date of Reissued Patent: Feb. 19, 2002

(54) CLUTCH DESIGN AND MANUFACTURE

(76) Inventor: Bill J. Hays, 15114 Adams St., Midway City, CA (US) 92655

(21) Appl. No.: 09/619,895

(22) Filed: Jul. 19, 2000

Related U.S. Patent Documents

Reissue of:
(64) Patent No.: 5,184,704
Issued: Feb. 9, 1993
Appl. No.: 07/743,756
Filed: Aug. 12, 1991

(51) Int. Cl.[7] ..... F16D 13/64
(52) U.S. Cl. ..... 192/70.14; 192/107 M
(58) Field of Search ..... 192/70.14, 107 M; 106/36

(56) References Cited

U.S. PATENT DOCUMENTS

| | | | |
|---|---|---|---|
| 3,042,168 | A | 7/1962 | Binder |
| 3,552,533 | A | 1/1971 | Nitz et al. |
| 3,841,949 | A | 10/1974 | Black |
| 3,895,693 | A | 7/1975 | Lucien et al. |
| 3,897,859 | A | 8/1975 | Norcia |
| 3,948,364 | A | 4/1976 | Lowey |
| 4,244,944 | A | 1/1981 | Wilkinson |
| 4,615,427 | A | 10/1986 | Majima |
| 4,830,164 | A | 5/1989 | Hays |
| 5,004,089 | A | 4/1991 | Hara et al. |

FOREIGN PATENT DOCUMENTS

| | | |
|---|---|---|
| GB | 2086494 | 5/1982 |

OTHER PUBLICATIONS

"Long–Life Clutch Material for Rugged Service", E.W. Drislane, SAE Journal, Mar. 1966, pp. 90, 91.

*Primary Examiner*—Rodney H. Bonck
(74) *Attorney, Agent, or Firm*—Brooks & Kushman

(57) ABSTRACT

There is disclosed a conversion for a clutch of a motor vehicle which uses a conventional Belleville spring to bias a pressure plate and clamp a clutch disc between the pressure plate and the flywheel of the vehicle. In this invention, the frictional linings of the conventional clutch are substituted by frictional linings which are preferably located at optimum geometric spacing, and which have from 30–70 percent less surface area for frictional engagement than that conventionally furnished with the clutch. The invention is particularly applicable to upgraded performance cars, e.g., the new line of SLP cars being introduced by some manufacturers.

14 Claims, 6 Drawing Sheets

CLUTCH DESIGN AND MANUFACTURE

Matter enclosed in heavy brackets [ ] appears in the original patent but forms no part of this reissue specification; matter printed in italics indicates the additions made by reissue.

BACKGROUND OF THE INVENTION

1. Field of Invention

This invention relates to clutches for motor vehicles and, in particular, to an improved design and application of frictional linings for enhanced performance of automotive clutches.

2. Brief Statement of the Prior Art

The typical automotive clutch has a clutch disc fixedly secured to the drive shaft and supported between the flywheel and a pressure plate. The clutch cover, which is bolted onto the flywheel includes a conical (Belleville) spring that is actuated by a clutch throw out mechanism and hydraulics to release the Belleville spring force against the pressure plate, clamping the clutch disc between the pressure plate and flywheel. The clutch disc supports frictional linings which usually have a metallic base ring on the theory that the high heat conductivity of a metal base ring would enhance heat transfer and thus reduce the tendency of the clutch linings to overheat.

The design of the present day automotive clutch is the result of a compromise of complex and competing design factors. Because of limitations in size and accessibility, and the requirement for a moderate pedal pressure, the maximum spring load which can be used with most clutches is from about 800 to about 2,000 pounds. The demand for increased performance of automobiles has increased the torque which is transmitted through the clutch and, accordingly, manufacturers provide clutches with clutch discs having diameters as large as practical to achieve moment arms adequate to handle the large torques transmitted by the clutches.

Most of the car manufacturers have elected to line the entire or substantially the entire face of the clutch disc with frictional linings, apparently on the theory of the more the better. This has resulted in the unit pressures applied to the clutch disc facings being approximately 25–30 psi.

Until the concern over the potential hazards to the public, asbestos-containing facings were the most commonly used facings. The phase out of asbestos facings has spurred development of new materials including in particular organic composite facings. These linings frequently have optimum unit pressures from about 35 to about 65 psi, or greater, which exceed the unit pressures of current clutch designs. This has caused a less than optimum performance of clutches, often observed as a chattering of the clutch, and high wear and maintenance of the clutch disc and its frictional facings. Further, the organic composite linings are particularly sensitive to high temperatures, loosing much of their performance when their temperatures exceed about 450 degrees F.

It is possible to improve clutch performance by increasing the size and strength of the Belleville spring, thus appearing a greater load to the clutch assembly. This approach, however, is not practical for a number of reasons. The clutches used in vehicles currently on the market have hundreds of differently sized and shaped Belleville springs and a conversion of even a small portion of the vehicles on the road and presently being manufactured would require many hundreds of thousand of dollars in tooling costs.

Additionally, the higher loads imposed on the clutch assembly by the increased Belleville spring force would lead to higher thrust and would require substantially complete redesigning of the clutch throw out mechanism and hydraulics. Accordingly, the approach of increasing the load applied to a clutch is not a practical solution for retrofitting the millions of vehicles currently on the road or being marketed.

Car manufacturers also seek higher and higher performance, leading to a new type of car, the Street Legal Performance (SLP) car which has performance characteristics which rival those of the dragsters and race cars of recent years past. The traditional approach by car manufacturers has been to increase horsepower and torque dramatically and to retool the drive train including the clutch to handle the greater power and torque. Usually clutches have been upgraded by increasing the clutch diameter and/or clamp load. This approach is expensive and usually requires retooling of related mechanical equipment.

There exists, today, a need for a simple and efficient conversion to increase the performance of clutches, specifically by increasing the unit pressure applied to clutch facings to the optimum value which provides maximum performance of the particular frictional facings used in the clutch. There also exists a need for a clutch lining having a design and formed of materials which protect the facing from overheating.

OBJECTIVES OF THE INVENTION

It is an object of this invention to provide a clutch of superior performance.

It is a further object of this invention to provide a clutch conversion which achieves superior performance.

It is also an object of this invention to provide a conversion for current clutches, which is useful for retrofit or original manufacturer equipment, without retooling, and without requiring re-machining of the mechanical components of the clutch.

It is likewise an object of this invention to provide a conversion for a clutch that will achieve optimum unit pressures for the particular frictional facings used in the clutch without changing the other components of the vehicle and clutch.

It is an additional object of the invention to provide a conversion for an automotive clutch that increases the effective clamp load of the clutch to the optimum unit pressure for the frictional facings of the clutch.

It is likewise an object of the invention to provide a method for car manufacturers to provide cars which share common clutch components, but which have widely varied performance capabilities.

It is still a further object of the invention to provide a clutch lining of an improved design and materials which minimize the tendency of the facing to overheat, chatter or slip.

BRIEF STATEMENT OF THE INVENTION

This invention includes a conversion for a clutch of a motor vehicle which uses a conventional Belleville spring to as a pressure plate and clamp a clutch disc between the pressure plate and the flywheel of the vehicle. In this invention, the frictional linings of the conventional clutch are substituted by frictional linings which are preferably located at optimum geometric spacing, and which have from 30–70 percent less surface area for frictional engagement than that conventionally furnished with the clutch.

Preferably, the linings of the invention having reduced area facings are located adjacent the peripheral areas of the clutch disc to provide maximum movement arm for torque transmission. The reduced area linings are also provided with a hole pattern for attachment to the clutch disc which will utilize the existing hole pattern of the clutch disc thereby avoiding any machining or alteration of the clutch disc. In the most preferred embodiment, only the frictional lining on the flywheel side of the clutch disc is substituted with one having a reduced area facing thereby preserving the optimum heat sink on the pressure plate side of the clutch disc.

The invention is particularly applicable to upgraded performance cars, e.g., the new line of SLP cars being introduced by some manufacturers. Increased performance of the conventional clutch is achieved with the invention without the necessity to retool or resize the clutch components. In a preferred embodiment, the invention includes clutch linings having non-metallic base rings, which are formed of low heat transfer coefficient materials, such as fiber-rein forced plastics. This provides the manufacturer the capability of molding the facings and base ring in a single operation (integral), or molding the facing and bonding it to the base ring in a single operation. The molding of the facings in this manner permits the manufacturer to quickly change production between moderate and high performance clutch linings simply by switching mold dies or adding inserts to the mold dies used to shape the facings.

BRIEF DESCRIPTION OF THE DRAWINGS

The invention will be described with reference to the figures of which.

DESCRIPTION OF PREFERRED EMBODIMENT

Figure 1:
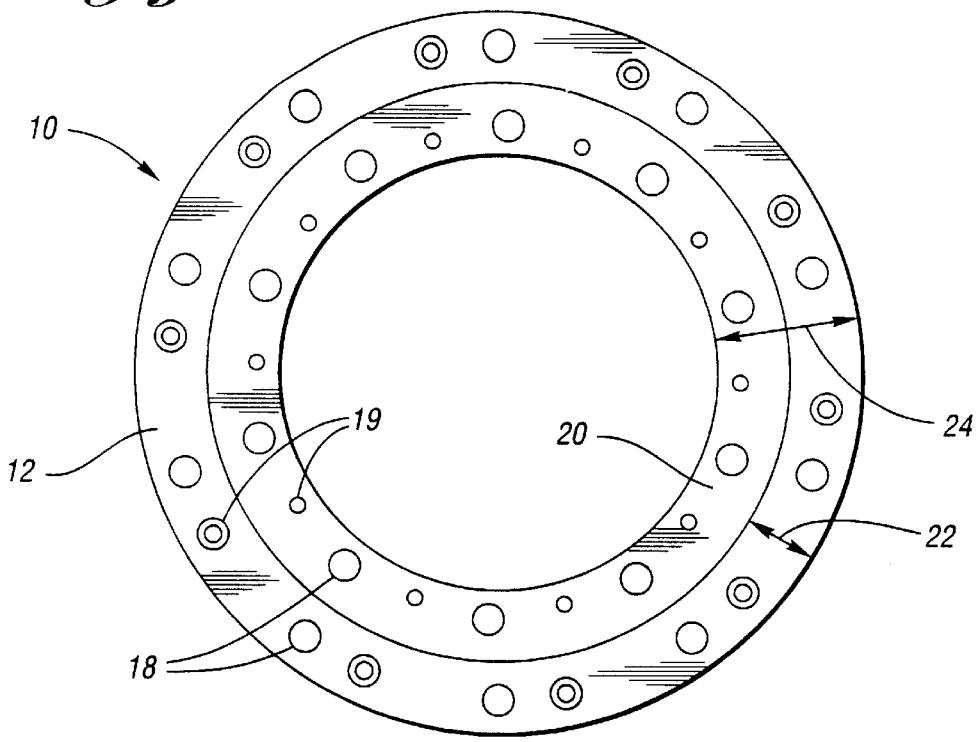
FIG. 1 is a plan view of a reduced area lining of the invention.

FIG. 1 is a plan view of a frictional lining 10 which has a facing 12 of a reduced area and which is intended for use on a clutch disc. The frictional facing is of conventional design and structure, having a backing ring 20 which is flat and circular and has a plurality of apertures 18 in a preselected pattern to receive fasteners for the attachment of the frictional lining 10 to a clutch disc. The backing ring has a thickness from 0.025 to about 0.060 inch. Commonly, the hole pattern for these fastener receiving apertures 18 is geometrically distributed across the entire circular surface of the backing ring 20. The backing ring has a hole pattern corresponding to that of the clutch disc for which it is intended. Generally the hole pattern will comprise a plurality of holes 19 which are of lesser diameter and are countersunk to receive the heads of rivets used to secure the lining to one side of a clutch disc, and holes 18 which receive the riveted ends of rivets used to secure a lining to the opposite side of the clutch disc.

The lining which is conventionally used typically spans the entire annular surface area of the backing ring 20 which has an annular width 24. Also, the backing ring 20 is commonly formed of a metal, selected for strength and high heat transfer, e.g., copper, aluminum, etc.

In this invention, however, a frictional facing 12 is used which has a significantly lesser surface area than conventionally used. As shown, the annular width 22 of facing 12 is approximately half the conventional width 24. Preferably, the facing 12 has an outer diameter sufficient to locate the facing 12 along the outer peripheral annular area of the backing ring 20. The facing 12 is bonded to the backing ring in a conventional manner using adhesives and bonding agents. In the preferred embodiment, the backing ring is formed of a low heat transfer coefficient resin, e.g., fiber reinforced plastics, as described with reference to FIGS. 5–8, hereof. With this embodiment, the facings can be integral with the backing ring 20, or can be molded or bonded thereto, as described hereinafter.

In the illustration, the frictional lining 10 has a diameter of 10.875 inches and the frictional facing applied to this clutch disc by the manufacturer has an inner diameter of 6.375 inches, providing a total surface facing area of about 61 square inches. The manufacturer's frictional facing is replaced in accordance with this invention with the narrow annular ring which has an inside diameter of 8.5 inches and an outer diameter of 10.875 inches for a total surface of 36 square inches. The frictional facing of the invention has 59% the surface area of the conventional facing, resulting in 69% increase in the unit pressure applied to the frictional facing, from that obtained with the conventional.

Figure 2:
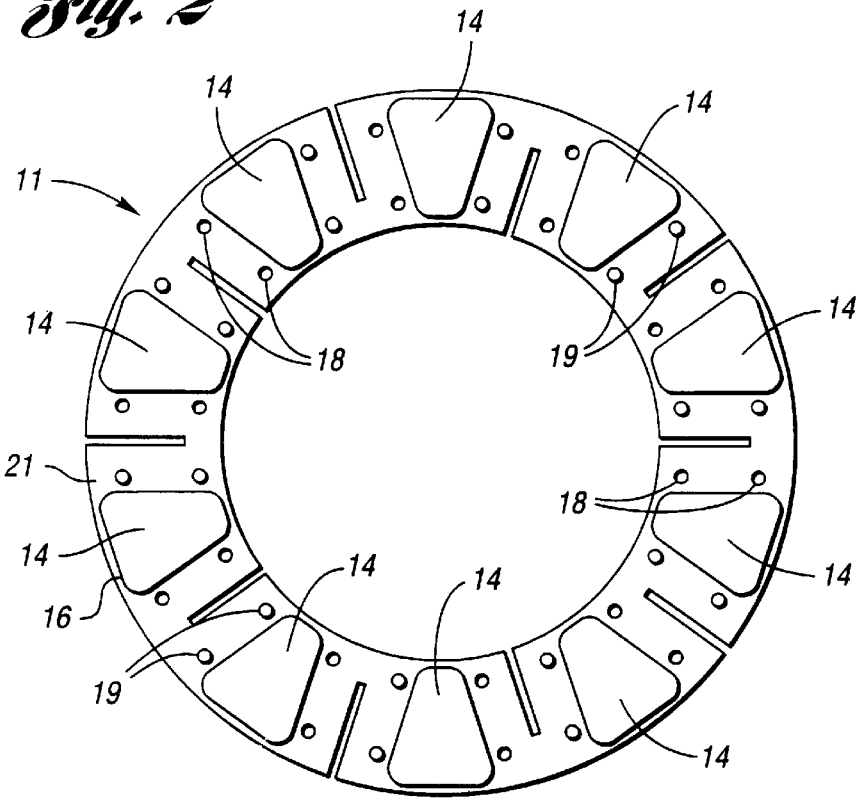
FIG. 2 is a plan view of an alternative reduced area lining of the invention.

FIG. 2 illustrates an alternative embodiment of the invention wherein the lining 11 has frictional facing which is in the form of a plurality of limited area pucks 14. In the illustration, a total of ten pucks are used, located at geometric spacings on a backing ring 21, which is substantially as described for ring 20 of FIG. 1. The pucks 14 have a trapezoidal shape and are located to provide the maximum moment arm, i.e., with their greatest width 16 located along the peripheral edge of the backing ring 20.

In the illustration, each puck has a surface area of approximately 2 square inches and the surface area of the backing ring 20 on which the pucks are bonded is about 53 square inches. Conventional facings used on the backing ring have an area very close to the maximum available, i.e., 53 square inches. Accordingly, the illustrated frictional lining 11 has a facing with a total area which is approximately 40 percent of the area of facing conventionally used, resulting in an increase in unit pressure on the clutch 50/20, or 250 percent.

The organic composite facing 12 and pucks 14 have a thickness typically from about ⅛ to about ¼ inch, and are formed of carbon, graphite, or thermosetting organic resins such as polyamides, urea formaldehyde, polyimides, polysulfides, etc., and are usually reinforced with fibrous materials such as chopped fiberglass, graphite fibers and the like. A facing material which can also be used is available under the designation: Carbon-Carbos, from HITCO, Gardena, Calif. This facing has a very high density carbon, with excellent wear and frictional properties. It has a porous carbon structure. It has the desirable characteristic of light weight, thereby reducing the inertia of the clutch disc and wear on the transmission. Another suitable composite organic facing is available under the designation: VGL LOCK from the Ray Mark Corporation, Manheim, Pa.

As previously mentioned, the most preferred embodiment of the invention uses a laminated composite for the frictional lining such as 10 or 11, shown in FIGS. 1 and 2. Thus, the backing rings 20 (FIG. 1) or 21 (FIG. 2) are most preferably formed of a fiber reinforced resinous layer. The preferred fiber reinforcement is a woven fabric of a suitably strong fiber, e.g., cotton, wool, Nylon, carbon, graphite, etc. The reinforcement fabric is impregnated as one, or preferably several layers in the resin used to form the backing ring. Suitable resins are those having high temperature strengths, e.g., high thermal strength epoxy resins, polysulfides, etc. This embodiment provides the advantage of high strength and reduced weight, compared to the metal backing rings which have been used previously. Any reduction in weight of the lining provides enhanced performance, since the magnitude of weight reduction is magnified by the reduction in inertia of the clutch disc at high engine speeds, facilitating shifting.

The use of a base ring having a low, rather than high, thermal conductivity also enhances performance and longevity of the clutch and linings. The frictional heat is released at the interface of the facings and the flywheel or pressure ring. Both of these parts are metallic and, thus, have high heat conductivities. When the backing ring has a low thermal conductivity, there is a reduction in the heat flux through the facings, since the metallic flywheel and pressure ring provide highly conductive heat paths, so that the heat flux path is through these metallic parts, not through the linings. Consequently, the linings exhibit a lesser tendency to overheat.

Figure 3:
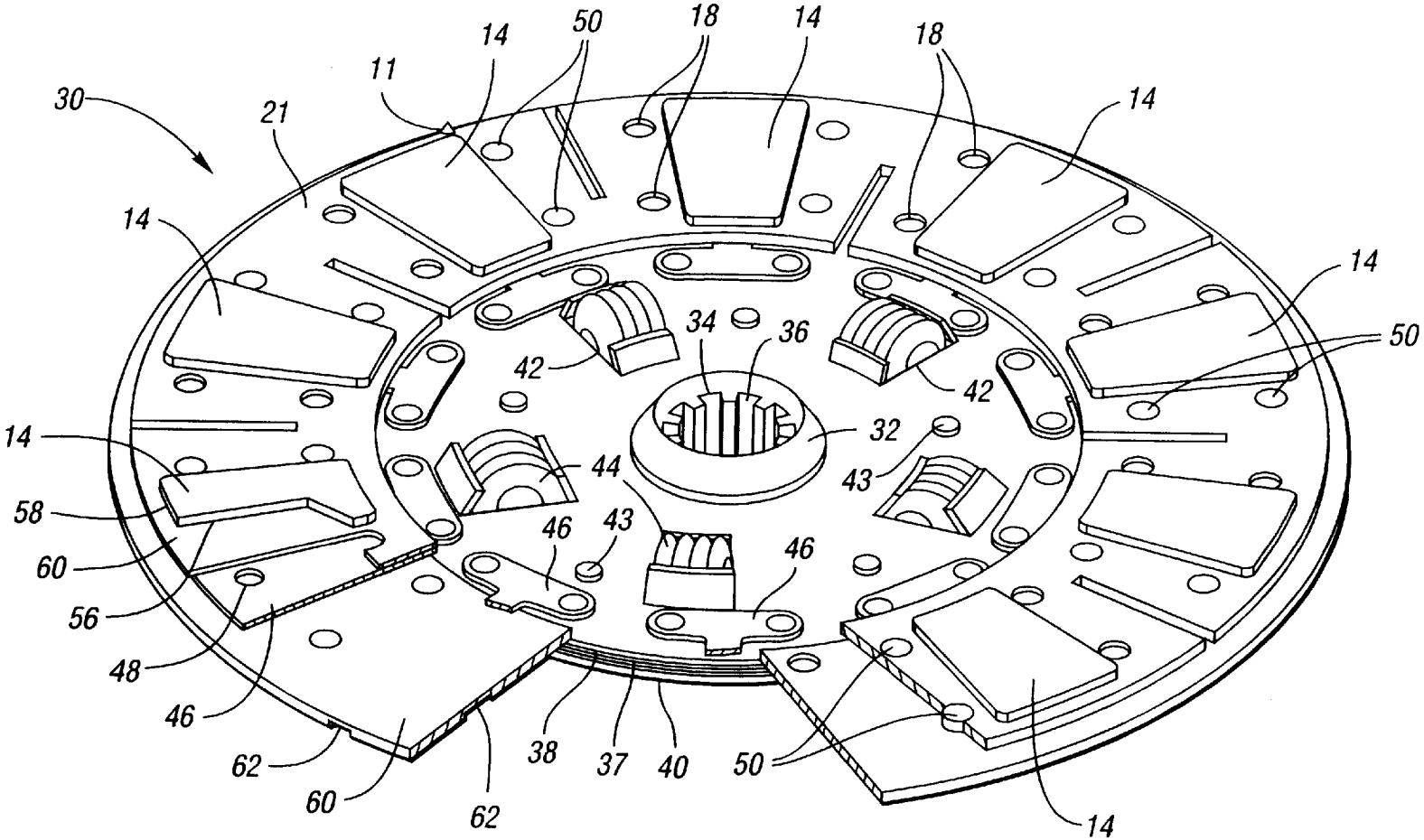
FIG. 3 is a cutaway perspective view of a clutch disc having a lining of reduced area and optimum geometrical spacing.

Referring now to FIG. 3, there is illustrated a clutch disc that has been retrofitted in accordance with the invention. The clutch disc 30 is illustrated with a portion cut away to illustrate the locations and relative sizes of the various components. The clutch disc 30 is of conventional design, with a central hub 32 with a through aperture 34 bearing internal splines 36 for sliding engagement and rotational indexing to a drive shaft. The hub is supported on a central plate 37 which is sandwiched between an upper plate 38 and a lower plate 40, which are secured in the assembly with fasteners 42 and which are held in a spaced apart relationship, on opposite sides of the central plate 37 by spacers (not shown).

A plurality of compression springs 44 are received in through slots 42 in the upper plate 38 and the lower plate 40. The central plate 37 also has aligned slots to receive the springs, which thus provide a resilient rotational interlock between these central hub plate (and hub 32) and the upper and lower plates 38 and 40, thus providing a dampening response to forces applied between the disc 30 and the drive shaft.

The upper plate 38 has a plurality of wings 46 (or marcels), which are riveted to the plate 38 about its periphery in even incremental spacings. These wings extend outwardly and provides support for the frictional linings of the disc. For this purpose, the wings have a pattern of through holes 48 to receive rivets which attach the frictional linings to its opposite sides.

The frictional lining 11, shown in FIG. 2 is riveted to the upper surface of the wings 46 and the holes through its backing disc are aligned with the holes of the wings and fasteners 50 are seated in recessed and countersunk holes 19 in the backing disc, thereby securing the frictional lining in the assembly. The holes 18 and 19 are located at a predetermined or preset geometric spacings for the particular clutch disc.

In accordance with this invention, the surface of the clutch disc is only partially covered by a plurality of pucks 14 which have a base 56 bonded to the backing ring 21, and an outer layer 58 of a suitable high friction characteristic material, e.g., organic composites and resins or ceramic metal materials. Typically the facings for most street vehicles are organic composite facings. The pucks 14 are disposed across the surface of the disc in an evenly space geometric pattern, typically at equiangular increments. Preferably the pucks 14 are located as close to the outer periphery of the clutch disc as practical while still utilizing the fastener apertures and aperture pattern provided by the manufacturer.

In the preferred embodiment, only the side of the clutch disc opposite the flywheel is altered by application of the linings of reduced frictional facing area. The lining 60 on the opposite side is preferably unchanged and is generally disposed across the entire surface of the disc in a conventional manner. Commonly, the manufacturer provides a plurality of equally spaced grooves 62 in the frictional facing 60, as illustrated.

For most applications, the use of facings of reduced area in accordance with this invention is sufficient to increase the unit pressure from the vehicle manufacturer's design value of 25 psi to at least 38 psi, and approximately to the optimum value for maximum performance of the facing.

Referring now to FIGS. 4–7, the application of the invention to a practical design application will be described. In a current application, a car manufacturer wishes to manufacture a series of cars with varied performances, from a sedate sedan to a street legal performance car, having many times the horsepower and torque of the sedate sedan. In such application, the clutch design is unchanged, except for the lining used on the clutch disc, and FIGS. 4–7 illustrate various linings which can be used. In the street legal performance upgrade shown in FIG. 4, the clutch disc receives a lining 13 which has a facing of an organic composite of greatly reduced area, which has an annular width shown at 23. The annular facing covers only 43 percent of the area of the backing, which is totally covered in the sedate sedan clutch. The facing thus has a unit pressure which is increased from approximately 25 psi to 58 psi.

Figure 5:
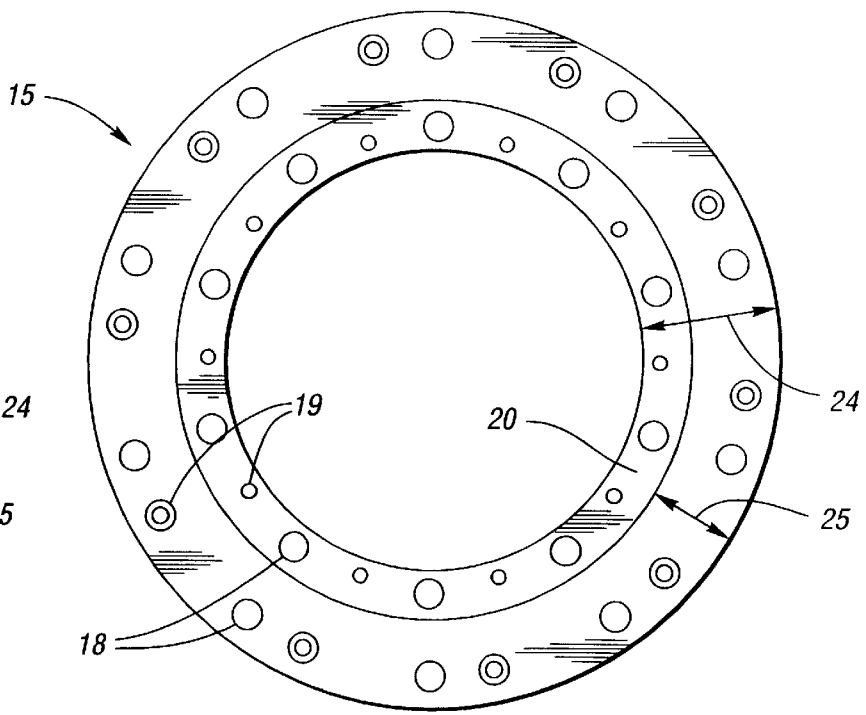
FIGS. 4–9 illustrate different designs for clutch linings of varied performance characteristics.

FIG. 5 illustrates a lining for an intermediate performance car, between that of the street legal performance car and the sedate sedan. The lining 15 has an engagement surface with an annular width 25, which is 68 percent of the total area, and which provides a unit pressure of 37 psi.

Figure 7:
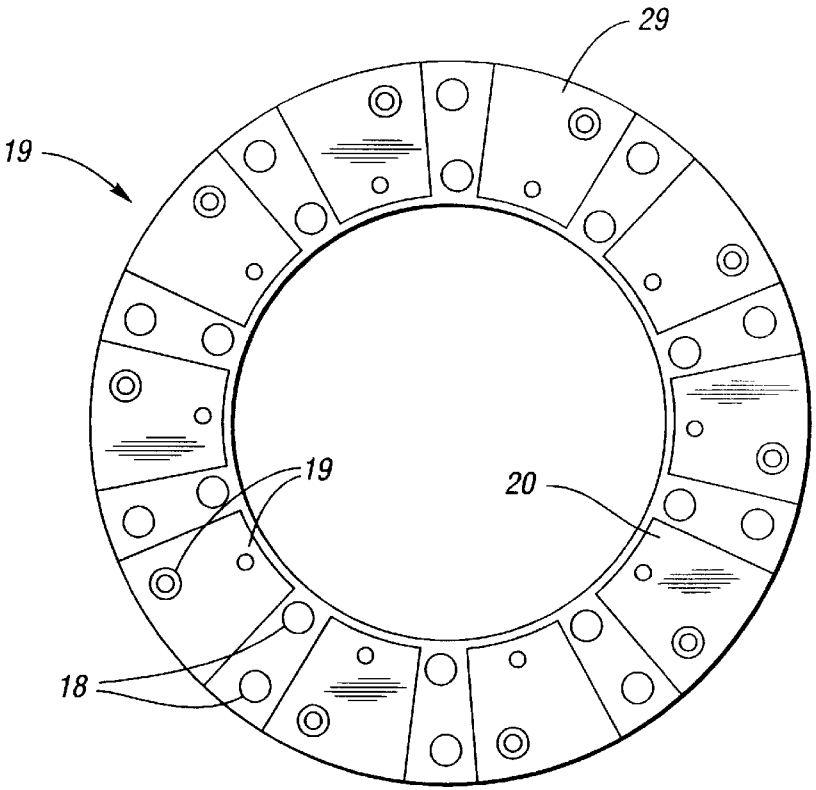
Figure 6:
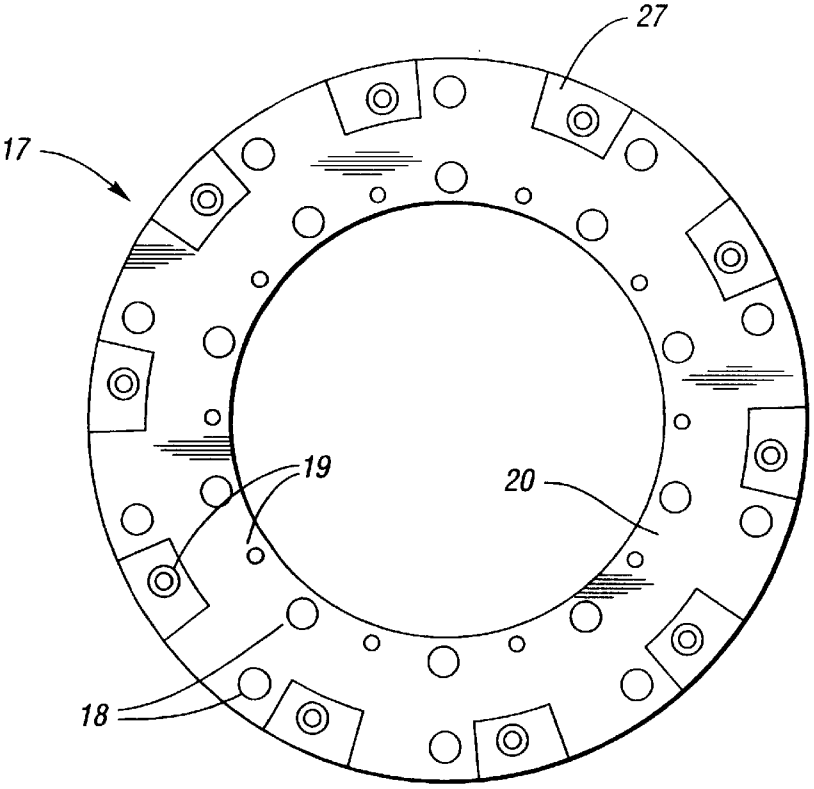

FIGS. 6 and 7 illustrate that the lining can be of varied geometric design and distribution on the backing ring. In these embodiments, a plurality of raised islands formed of an organic composite having high frictional properties are distributed evenly about the periphery of the backing ring. The islands 27 of FIG. 6 have a total surface area which is 19 percent of the area of the backing ring, while the islands 29 of the FIG. 7 lining have an area which is 65 percent of the area of the backing ring. The facing of FIG. 6 thus provides a unit pressure of 132 psi, and that of FIG. 7 provides a unit pressure of 38.5 psi.

Figure 8:
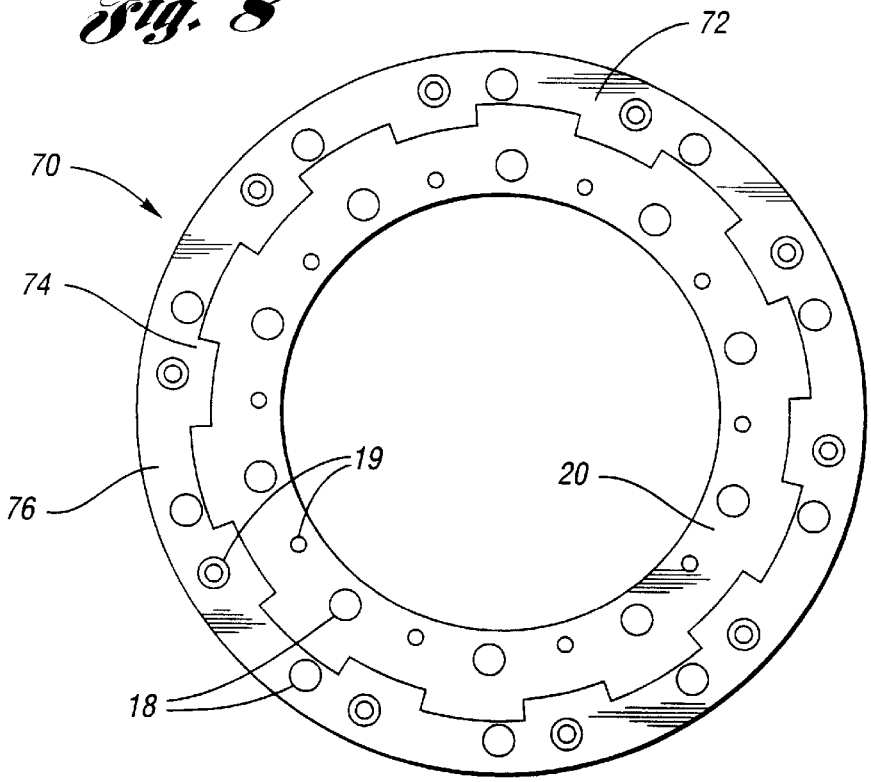

An alternative lining 70 is shown in FIG. 8. This lining 70 has a base plate 20 with the typical annular shape and with the standardized pattern of apertures 18 and 19 for fasteners to secure the lining (and the lining on the opposite side of the disc) to the clutch disc. The frictional facing 72 on this lining 70 has a geometric pattern which corresponds somewhat to the hole pattern, with raised islands 74 surrounding each of the fastener holes 18 and 19 which are located along the outer edge of the lining 70. The islands 74 can be connected with raised ridges 76, all integral with, and having the same thickness as, the islands 74. Preferably, the lever arm of the disc is maximized by locating the greatest area of the facing adjacent the periphery of the base ring 20. This construction will provide the minimum weight of the lining, yet will provide excellent performance, since the total surface area of the frictional facing is limited to a value which will achieve the optimum unit pressure for the particular material used for the frictional facing, e.g., from about 35 to 135 psi.

Figure 9:
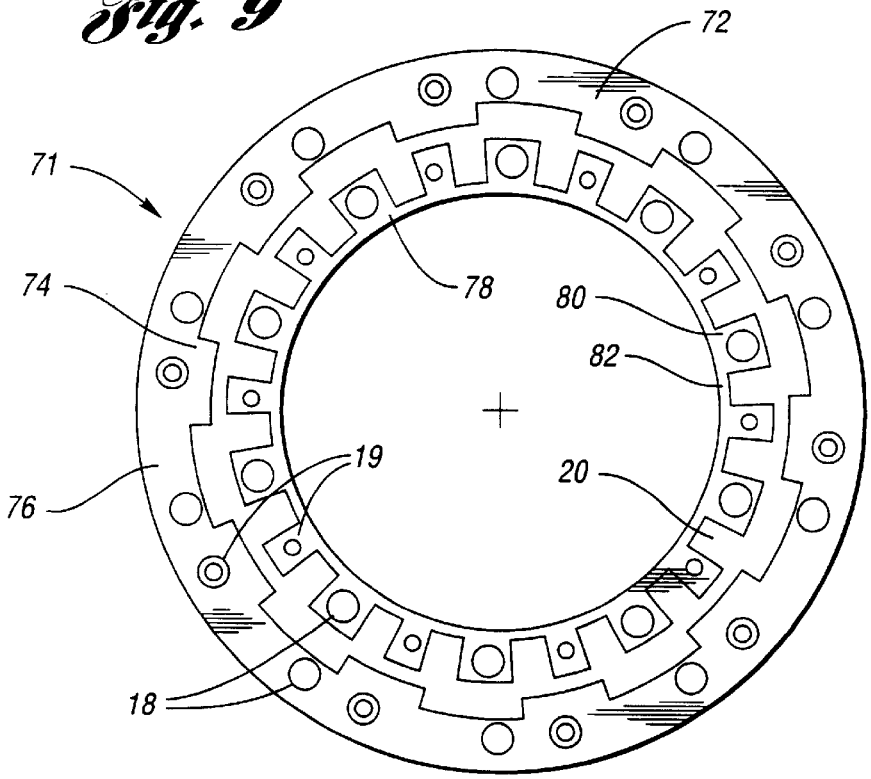

FIG. 9 illustrates another lining 71 which is the same as that shown in FIG. 8, however, it also has raised islands 80 of frictional facing material surrounding the apertures adjacent the inner edge of the base plate 20. The islands 80 can also be connected by an annular ridge 82 to form a facing 78 which is located adjacent the inner edge of the base plate 20. In this embodiment, all of the apertures 18 and 19 are located within a facing, thus providing additional shear strength to the lining and its attachment to the clutch disc.

The linings shown in FIGS. 4–9 are preferably formed entirely of organic resin, thus providing minimum inertia, and maximum heat isolation for the linings. Thus, the backing ring 20 is formed entirely of fiber-reinforced resins, such as previously mentioned, and the annular rings of FIGS. 4 and 5, or the islands of FIGS. 6–9 are bonded to the backing ring.

Figure 10:
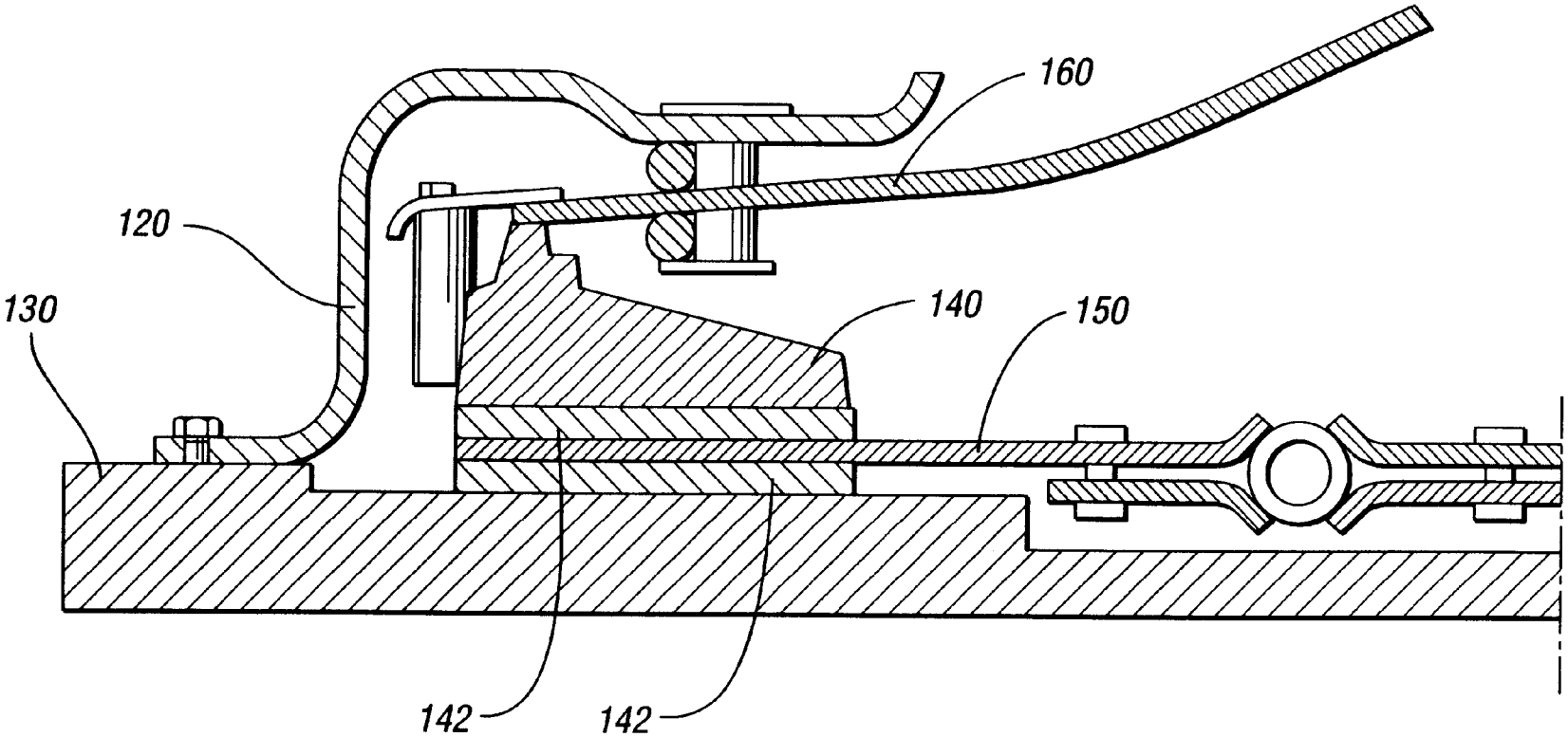
Fig. 10 (PRIOR ART)
FIG. 10 is a sectional view of a conventional clutch.

The typical automotive clutch shown in FIG. 10 has a clutch disc 150 fixedly secured to the drive shaft and supported between the flywheel 130 and a pressure plate 140. The clutch cover 120, which is bolted onto the flywheel includes a conical (Belleville) spring 160 that is actuated by a clutch throw out mechanism and hydraulics to release the Belleville spring force against the pressure plate 140, clamping the clutch disc 150 between the pressure plate 140 and flywheel 130. The clutch disc supports frictional linings 142.

In the most preferred embodiment, the linings are manufactured by molding of the linings of resins with woven filaments or chopped fibers as reinforcement. The entire lining, including the backing ring 20 and the raised frictional facing, e.g., islands 27 or 29, can be manufactured in a single molding operation, when the backing ring 20 and facings have the same composition. Usually, however, it will be desirable to optimize the properties of these elements by selecting a fiber reinforcement and/or resin exhibiting maximum hoop or flexural strength for backing ring 20, and maximum wear resistance and frictional characteristics for the islands 27. In such cases, each will be separately molded and then bonded together, or the islands will be molded and bonded to a preformed backing ring in a single molding step.

Figure 4:
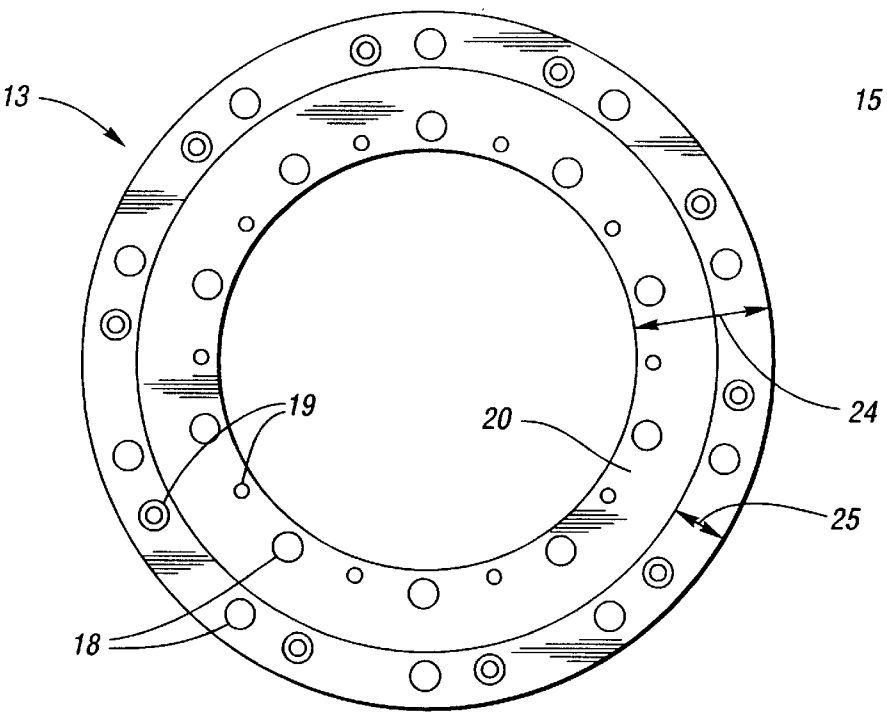

In this manufacture, the shapes and locations of the high frictional areas such as the annular rings 23 or 25 of FIGS. 4 and 5, or the raised islands 27 and 29 of FIGS. 5–8 are formed simply by changing the die cavities of the manufacturing mold, or by adding or removing inserts within the mold cavities. The manufacture of clutches of widely varied performance can thereby be achieved with relatively minor and simple changes in the manufacturing equipment, without any significant retooling, and an infinite number of possible shapes and locations of the frictional facings is available to the clutch designer.

The invention provides a simple and inexpensive retrofit of conventional clutches which achieves maximum performance and useful life of the linings of the clutch. There is no requirement for machining of any of the clutch components, or retooling of manufacturing equipment. Clutches retrofitted with linings designed in accordance with the invention have greatly reduced tendencies to chatter, and have less maintenance and repair.

What is claimed is:

[1. In an automotive clutch wherein a clutch disc having first and second, organic composite, non-metallic, frictional linings, one each on opposite sides thereof, is carried on a drive shaft and is located between a pressure ring and a flywheel, and including means to apply a compressive clamp load of a predetermined maximum value to clamp said disc between said ring and flywheel; the improvement thereof which comprises at least one of said first and second frictional linings having an organic composite, non-metallic, frictional facing with an area which is limited to no more than 59 percent of the available area of said disc, sufficient to provide a unit pressure, with the predetermined maximum clamp load on said facing, which is at least 35 psi.]

[2. The clutch improvement of claim 1 wherein said frictional facing having said limited area provides a unit pressure at said predetermined maximum clamp load, which is from 45 to about 125 pounds per square inch.]

[3. The clutch improvement of claim 2 wherein said frictional facing of limited area is located on the side of said clutch disc which faces said flywheel.]

[4. The clutch improvement of claim 1 wherein both said first and second frictional linings are organic composite, non-metallic facings of limited area.]

[5. The clutch improvement of claim 1 wherein said facing of limited area is located in an outer annular area of said disc.]

[6. The clutch improvement of claim 5 wherein said outer annular area is an annular ring adjacent the periphery of said disc.]

[7. The clutch improvement of claim 1 wherein said facing of limited area comprises a plurality of raised islands interspaced on the surface of said disc in a geometric pattern and at equal spacings.]

[8. The clutch improvement of claim 7 wherein said linings are secured to said clutch disc by a plurality of fasteners at locations and spacings corresponding to predetermined locations and spacings.]

9. A frictional lining for a clutch disc which comprises:

a. a base ring formed entirely of a fiber-reinforced resin and having a first thickness and an annular area;

b. an organic composite, non-metallic frictional facing on the surface of said base ring and formed of a high frictional resin material having a second thickness greater than said first thickness, and a limited area, less than the annular area of said base ring to provide a frictional area which is no more than 59% of said annular area and is limited sufficiently to provide a unit pressure from the maximum clamp load on said facing which is at least 35 psi.

10. The frictional lining of claim 9 wherein said frictional facing provides an area which is limited sufficiently to provide a unit pressure from the maximum clamp load on said facing which is at least 35 psi.

11. The frictional lining of claim 10 wherein said frictional facing having said limited area provides a unit pressure at said predetermined maximum clamp load which is from 45 to about 125 pounds per square inch.

12. The frictional lining of claim 10 wherein said base ring has a plurality of through holes at a preselected pattern and wherein said frictional facing comprises an annular of said high frictional resin having a lesser annular width than said ring.

13. The frictional lining of claim 9 wherein said frictional facing comprises a plurality of raised islands of limited area and located in a selected geometric pattern across the face of said annular base ring.

14. The frictional lining of claim 13 wherein said fiber reinforcement in said annular base ring comprises a woven fabric.

*15. In an automotive clutch disc assembly comprising first and second clutch linings on annular backing ring surfaces*

*having inner and outer diameters, the linings being on opposite sides of said clutch disc assembly, said clutch disc assembly being carried on a drive shaft and being located between a pressure ring and a flywheel with friction pressure surfaces thereon, including means for applying a compressive clamp load on said disc assembly of a predetermined maximum value to clamp said disc assembly between said pressure ring and said flywheel;*

*the improvement thereof which comprises first and second clutch linings wherein at least one of said first and second clutch linings comprises arcuate segments with multiple, angularly-spaced organic, composite, nonmetallic, frictional planar facings offset from its annular backing ring surface to provide frictional clutch torque as the compressive clamp load is applied to the disc assembly, the planar facings having an area that is limited to no more than 59 percent of the annular area between the inner and outer diameters of the one clutch lining thereby providing a unit pressure, with a predetermined maximum clamp load on said planar facings that is at least 35 psi.*

*16. The clutch disc assembly of claim 15 wherein said frictional facings of limited area provide a unit pressure, at said predetermined maximum clamp load, which is from 45 to about 125 pounds per square inch.*

*17. The clutch disc assembly of claim 16 wherein said frictional facings of limited area are located on the side of said clutch disc that faces said flywheel.*

*18. The clutch disc assembly of claim 15 wherein both said first and second clutch linings have organic composite, non-metallic facings of limited area.*

*19. The clutch disc assembly of claim 15 wherein said facings of limited area are located in a radially outward annular area of said disc assembly.*

*20. The clutch disc assembly of claim 19 wherein said radially outward annular area is an annular ring adjacent the outer periphery of said disc assembly.*

*21. The clutch disc assembly of claim 15 wherein said facings of limited area comprise a plurality of raised islands angularly spaced on the surface of said facing in a geometric pattern and at equal spacings.*

*22. The clutch disc assembly of claim 21 wherein said linings are secured to said backing ring by a plurality of fasteners at locations and spacings corresponding to predetermined locations and spacings.*

* * * * *